(12) United States Patent
McDonagh et al.

(10) Patent No.: US 11,034,592 B1
(45) Date of Patent: Jun. 15, 2021

(54) MICROPLASTIC CLEANING, COLLECTION, AND AUTONOMOUS FILTRATION

(71) Applicant: International Business Machines Corporation, Armonk, NY (US)

(72) Inventors: James McDonagh, Frodsham (GB); Malgorzata Jadwiga Zimon, Warrington (GB); Breanndan O'Conchuir, Warrington (GB); Robert Sawko, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/700,332

(22) Filed: Dec. 11, 2019

(51) Int. Cl.
| | |
|---|---|
| *C02F 1/00* | (2006.01) |
| *G05B 13/02* | (2006.01) |
| *G05B 13/04* | (2006.01) |
| *B08B 3/12* | (2006.01) |
| *B08B 3/00* | (2006.01) |
| *C02F 101/30* | (2006.01) |

(Continued)

(52) U.S. Cl.
CPC .............. *C02F 1/001* (2013.01); *B08B 3/003* (2013.01); *B08B 3/12* (2013.01); *C02F 1/008* (2013.01); *G05B 13/0265* (2013.01); *G05B 13/048* (2013.01); *C02F 2101/30* (2013.01); *C02F 2103/007* (2013.01); *C02F 2103/08* (2013.01); *C02F 2201/008* (2013.01)

(58) Field of Classification Search
CPC .... C02F 1/001; C02F 1/008; C02F 2201/008; C02F 2103/08; C02F 2101/30; C02F 2103/007; G05B 13/048; G05B 13/0265; B08B 3/003; B08B 3/12

USPC ........... 210/739, 242.1, 143, 748.02, 748.05, 210/747.6, 210, 170.05
See application file for complete search history.

(56) References Cited

U.S. PATENT DOCUMENTS

| | | |
|---|---|---|
| 6,231,766 B1 | 5/2001 | Hausin |
| 6,826,591 B2 | 11/2004 | French et al. |
| 2003/0212899 A1 | 11/2003 | Curtis |

(Continued)

FOREIGN PATENT DOCUMENTS

| | | |
|---|---|---|
| CN | 108177273 A | 6/2018 |
| CN | 109018221 A | 12/2018 |

(Continued)

OTHER PUBLICATIONS

Lorenzo-Navarro et al., "Deep Learning vs Classical Computer Vision Techniques for Microplastics Classification," Spain, Printed Oct. 22, 2019, 1 page.

(Continued)

*Primary Examiner* — Fred Prince
(74) *Attorney, Agent, or Firm* — Peter Edwards

(57) ABSTRACT

An apparatus, a method, and a computer program product for cleaning and collecting microplastics and modelling workflow for microplastic autonomous filtration. The apparatus may include a cleaning chamber through which water containing the microplastics flows. The apparatus may also include a transducer configured to generate microbubbles of a size that causes the microbubbles to clean microplastics flowing through the cleaning chamber. The apparatus may also include a filter chamber located above the cleaning chamber, where the filter chamber includes a microplastic collection device operable to collect the microplastics.

20 Claims, 5 Drawing Sheets

(51) Int. Cl.
  *C02F 103/00* (2006.01)
  *C02F 103/08* (2006.01)

(56) References Cited

U.S. PATENT DOCUMENTS

| | | | | |
|---|---|---|---|---|
| 2011/0266200 | A1* | 11/2011 | Day | C02F 1/001 |
| | | | | 210/170.05 |
| 2014/0138288 | A1* | 5/2014 | Ward | B03C 7/006 |
| | | | | 209/12.2 |
| 2016/0185618 | A1* | 6/2016 | De Luca | C02F 1/008 |
| | | | | 210/747.6 |
| 2017/0046146 | A1 | 2/2017 | Jamjoom et al. | |
| 2018/0217029 | A1 | 8/2018 | Billings et al. | |
| 2018/0217067 | A1 | 8/2018 | Gallager | |
| 2019/0358352 | A1* | 11/2019 | Qamar | B08B 3/102 |

FOREIGN PATENT DOCUMENTS

| | | | |
|---|---|---|---|
| CN | 109133428 A | 1/2019 | |
| CN | 109655321 A | 4/2019 | |
| CN | 110015727 A | 7/2019 | |
| CN | 110092492 A | 8/2019 | |
| GB | 2458888 A | 7/2009 | |
| WO | 2016175985 A1 | 11/2016 | |

OTHER PUBLICATIONS

"Oceanic Plastic Pollution in 10 Key Figures," The Sea Cleaners, Printed Nov. 4, 2019, 3 pages https://www.theseacleaners.org/en/.
"Ocean Phoenix Project," Ocean Phoenix 360, Supersized Factory Ship Retrieving Ocean Plastic Waste, Printed Nov. 4, 2019, 3 pages, https://www.oceanphoenixproject.com/ocean-phoenix-360.
"Sea Vax—Robotic Vacuum Ship," Bluebird Marine Systems Ltd., Printed Nov. 4, 2019, 33 pages http://www.bluebird-electric.net/oceanography/Ocean_Plastic_International_Rescue/SeaVax_Ocean_Clean_Up_Robot_Drone_Ship_Sea_Vacuum.htm.
"Pioneering Microscopic Reality with New AI-powered Microscopes," IBM Research Editorial Staff, Mar. 22, 2018, 8 pages, https://www.ibm.com/blogs/research/2018/03/microscopic-reality-ai-microscopes/.
Clean is the Aim, CLAIM, © 2018 CLAIM Project, Printed Nov. 4, 2019, 4 pages http://www.claim-h2020project.eu/.
"Pollution Management," WasteShark, Ecocoast, Ecobarrier Bubble Curtains, Printed Nov. 4, 2019, 10 pages http://www.ecocoast.com/wasteshark/.
"Trash interceptor," Wikipedia The Free Encyclopedia, Printed Nov. 7, 2019, 2 pages https://en.wikipedia.org/wiki/Trash_interceptor.
"Passive cleanup system How it works," The Ocean Cleanup, Printed Nov. 7, 2019, 12 pages https://theoceancleanup.com/oceans/.
"Microplastics: Occurrence, effects and sources of releases to the environment in Denmark," Ministry of Environment and Food, the Danish Environmental Protection Agency, Environmental project No. 1793, 2015, 208 pages.
Kaiser et al., "Effects of biofouling on the sinking behavior of microplastics" Environmental Research Letters, IOP Publishing, 2017, 11 pages, https://doi.org/10.1088/1748-9326/aa8e8b.
"Congress Review," Review of the 26th United European Gastro-enterology (UEG) Week, Vienna Austria, 2018, 16 pages.
Cózar et al., "Plastic debris in the open ocean" Proceedings of the National Academy of Sciences of the USA, 2014, 24 pages, https://doi.org/10.1073/pnas.1314705111.
Lebreton et al., "Evidence that the Great Pacific Garbage Patch is rapidly accumulating plastic," Scientific Reports 8, 2018, 47 pages, https://www.nature.com/articles/s41598-018-22939-w.
"Research Project: StarStream (2007-2015)—Cleaning with low volumns of cold water," StarStream, Printed Dec. 2, 2019, 17 pages, https://www.southampton.ac.uk/engineering/research/projects/starstream.page.
Rummel et al., Impacts of Biofilm Formation on the Fate and Potential Effects of Microplastic in the Aquatic Environment, ACS Publications, Jun. 13, 2017, 11 pages, https://pubs.acs.org/doi/abs/10.1021/acs.estlett.7b00164.
"How much microplastics does bottled water contain?", TAPP Water, Printed Dec. 2, 2019, 3 pages, https://tappwater.co/en/how-to-filter-and-remove-microplastics/.
Schymanski et al., "Analysis of microplastics in water by micro-Raman spectroscopy: Release of plastic particles from different packaging into mineral water," ScienceDirect, Water Research, vol. 129, Feb. 2018, 3 pages https://www.sciencedirect.com/science/article/abs/pii/S0043135417309272.
Talvitie et al., "Solutions to microplastic pollution—Removal of microplastics from wastewater effluent with advanced wastewater treatment technologies," Research Gate, Printed Dec. 2, 2019, 7 pages https://www.researchgate.net/publication/318106121_Solutions_to_microplastic_pollution_-_Removal_of microplastics_from_wastewater_effluer.
Benes et al., "Ultrasonic separation of suspended particles," Proceedings of the IEEE Ultrasonics Symposium, Feb. 2001, vol. 1, 5 pages https://www.researchgate.net/publication/3941396_Ultrasonic_separation_of suspended_part.
Lee et al., "Separation and Concentration of Particles in Fluid Using Ultrasonic Standing Wave," Abstract Only, Scientific.Net, Printed Dec. 2, 2019, 3 pages, https://www.scientific.net/KEM.321-323.63.
"Swedish Water Education," Fresh Water, Clean Lakes and Oceans, Printed Dec. 2, 2019, 2 pages https://www.svensktvatten.se/globalassets/utbildning/konferenser-och-seminarier/microplastics/07_talvitie_mp_in_wwtp.pdf.
Kyzas et al., "Flotation in Water and Wastewater Treatment," MDPI, Aug. 7, 2018, 31 pages https://www.mdpi.com/2227-9717/6/8/116/htm.
"NPTEL :: Courses," Printed Dec. 2, 2019, 4 pages, https://nptel.ac.in/courses/103103033/module6/lecture6.pdf.
"Sample Records for Wastewater Purification Bubble Flotation Microplastic," science.gov, Printed Dec. 2, 2019, 207 pages, https://www.science.gov/topicpages/w/wastewater+purification+bubble+flotation+microplastic#.
Smirnov et al., "The bubble method of water purification," IOP Science, Apr. 20, 2018, 3 pages https://iopscience.iop.org/article/10.1209/0295-5075/121/48007.
Filippov et al., "Improvement of ore recovery efficiency in a flotationcolumn cell using ultra-sonic enhanced bubbles," IOP Science, Journal of Physics, Conference Series, vol. 879, Conference 1, Printed Dec. 2, 2019, 7 pages https://iopscience.iop.org/article/10.1088/1742-6596/879/1/012023.

\* cited by examiner

US 11,034,592 B1

MICROPLASTIC CLEANING, COLLECTION, AND AUTONOMOUS FILTRATION

BACKGROUND

The present disclosure relates to microplastic cleaning and collection, as well as autonomous filtration, and more specifically to cleaning and collecting microplastics and modelling workflow for microplastic autonomous filtration.

SUMMARY

The present disclosure provides an apparatus, a method, and computer program product to clean and collect microplastics and model workflow for microplastic autonomous filtration. The apparatus may include a cleaning chamber through which water containing the microplastics flows. The apparatus may also include a transducer configured to generate microbubbles of a size that causes the microbubbles to clean microplastics flowing through the cleaning chamber. The apparatus may also include a filter chamber located above the cleaning chamber, where the filter chamber includes a microplastic collection device operable to collect the microplastics.

The method for cleaning and collecting microplastics and modelling workflow for microplastic autonomous filtration may include passing water containing the microplastics from the aquatic environment through a cleaning chamber. The method may also include generating, using a transducer, microbubbles in the cleaning chamber. The method may also include collecting microplastics that have been cleaned by the microbubbles from an upper portion of the cleaning chamber using a microplastic collection device.

The computer program product to clean and collect microplastics and model workflow for microplastic autonomous filtration may be configured to perform a method, the method including receiving external data and simulation results at a central controller. The method may also include receiving data on local environment conditions and actual microplastic concentration from a plurality of remote devices. The method may also include generating microbubbles in a cleaning chamber. The method may also include collecting local environment conditions and actual microplastic concentrations on at least one of the remote devices. The method may also include retraining a local model of likely locations and concentrations of microplastics using the local environment conditions and the actual microplastic concentrations. The method may also include applying the retrained model.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
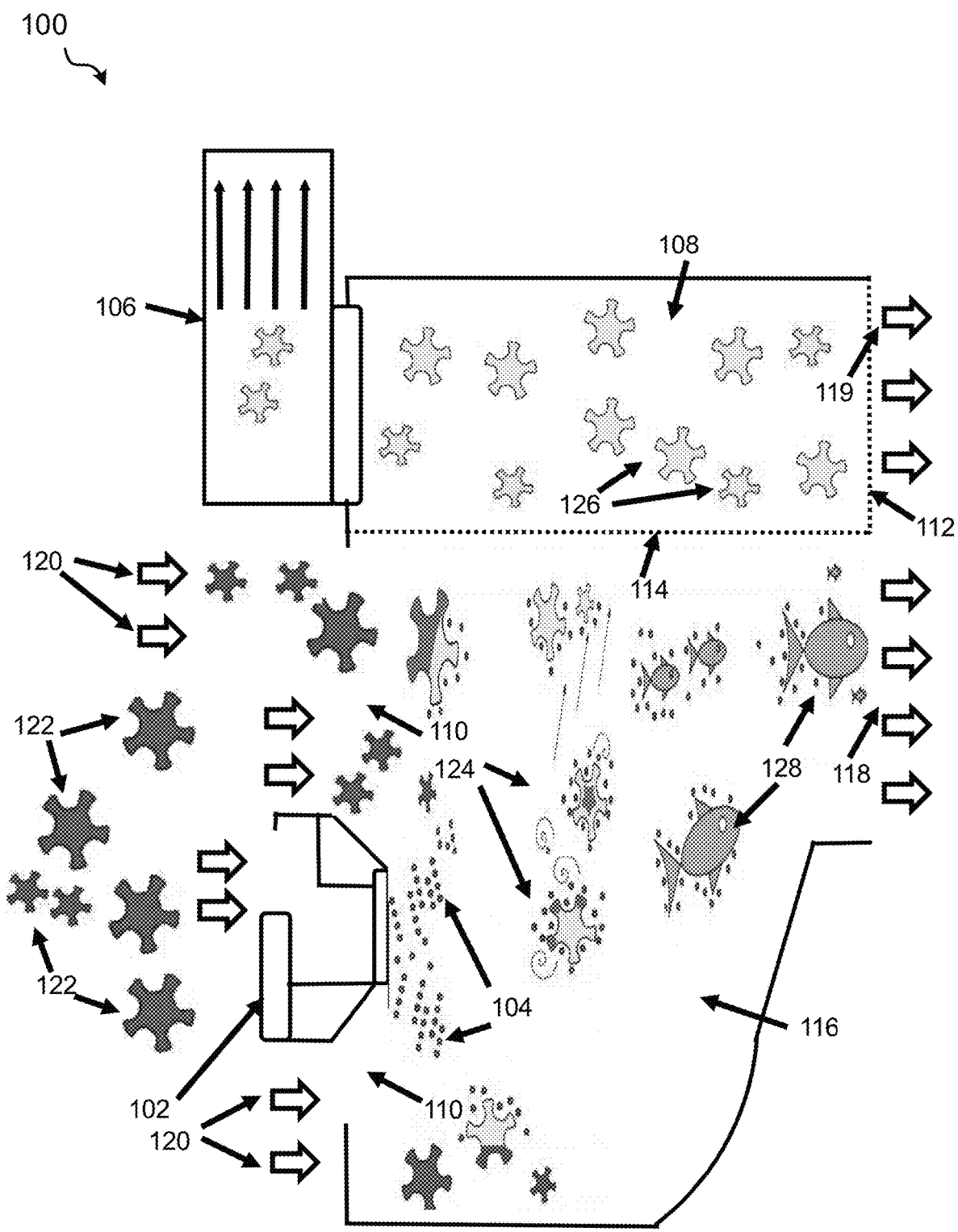
FIG. 1 depicts a schematic diagram of an apparatus for cleaning and collecting microplastics in an aquatic environment, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to microplastic cleaning and collection, as well as autonomous filtration, and more specifically to cleaning and collecting microplastics and modelling workflow for microplastic autonomous filtration. While the present disclosure is not necessarily limited to such applications, various aspects of the disclosure may be appreciated through a discussion of various examples using this context.

Plastics are in widespread use within modern society and have become a major pollutant in oceans, seas, and rivers. An example of this type of pollution is the Great Pacific Garbage Patch which has been estimated to hold 1.8 trillion pieces of plastic, weighing 79 kilotons and floating over an area of 1.6 million square kilometers. Due to the long decomposition time and associated toxic effects of pieces of plastic, there are many implications on aquatic and marine ecosystems as well as on human health and/or safety. Cleanup operations are difficult and current pollution cleanup technology struggles due to large areas affected and the distance from potential deposition sites.

Microplastics may be any kind of plastic that is smaller than a given size, often invisible to the naked eye. More specifically, microplastics may be, as defined by the U.S. National Oceanic and Atmospheric Administration, particles less than 5 millimeters (mm) in diameter. According to recent estimates, microplastics constitute about 8% of the ocean plastic pollution and pose a serious threat due to their small size and lower buoyancy than larger pieces of plastic.

The small size of the microplastics may increase the probability for the microplastics to be ingested and incorporated into the bodies and tissues of living organisms. Studies have shown a presence of microplastics in fish and more recently in human feces. Additionally, the decreased buoyancy of microplastics due to mechanisms such as biofouling (i.e., fouling due to accumulation of biological particles such as algae, bacteria, microorganisms, etc.) means that these biofouled plastics can no longer be recovered by operations near the ocean surface, further frustrating any cleanup efforts. Further, the quantity of microplastics may have increased by two orders of magnitude over the past four decades, which suggests that the problem is getting worse, likely due to increased production and the break-up of macroplastics (e.g., particles of plastic, for instance, with a diameter of more than 5 mm).

The present disclosure provides an apparatus, a method, and computer program product to clean and collect microplastics and model workflow for microplastic autonomous filtration. Embodiments of the invention provide a method of cleaning and collecting microplastics in an aquatic environment, including: passing water containing the microplastics from the aquatic environment through a cleaning chamber; cleaning the microplastics flowing through the cleaning chamber using microbubbles generated by a transducer; and collecting the microplastics from an upper portion of the cleaning chamber using a microplastic collection device.

Some embodiments further provide the method above further including: receiving external data and simulation results at a central control; receiving data on local environment conditions and actual microplastic concentration from a plurality of remote devices, the remote devices including the cleaning chamber, the transducer and the microplastic collection device; and at least one of the remote devices collecting local environment conditions and actual microplastic concentrations, retraining a local model of likely locations and concentrations of microplastics and applying the retrained model.

Some embodiments may also provide a computer program product for managing the cleaning and collection of microplastics in an aquatic environment, the computer program product including: a computer readable storage medium having program instructions embodied therewith, the program instructions executable by a computer to cause the computer to: receive external data and simulation results at a central control; receive data on local environment conditions and actual microplastic concentration from a plurality of remote devices, the remote devices including a cleaning chamber through which water containing the microplastics from the aquatic environment flows through, a transducer generating microbubbles for cleaning the microplastics flowing through the cleaning chamber and a microplastic collection device for collecting the microplastics from an upper portion of the cleaning chamber using a microplastic collection device; and at least one of the remote devices collecting local environment conditions and actual microplastic concentrations, retraining a local model of likely locations and concentrations of microplastics and applying the retrained model.

Referring now to FIG. 1, a diagram of an apparatus 100 for cleaning and collecting microplastics 122 in an aquatic environment is depicted, according to some embodiments. Apparatus 100 may float, or it may be submerged, and may, in some instances, be powered be renewable means, such as solar power or tidal energy.

Apparatus 100 comprises a cleaning chamber 116, an upper filter chamber 108 and a vacuum head 106 for collecting microplastics 126. Inlet 110 allows water flow 120 containing microplastics 122 coated with algae and/or bacteria to flow through the cleaning chamber 116. In a preferred embodiment, the water flow 120 and contained microplastics 122 coated with algae and/or bacteria flow through the cleaning chamber 116 as the apparatus 100 is moved through the water flow 120. In some embodiments, the water flow 120 is pumped through the cleaning chamber 116. The shape of the cleaning chamber 116 shown in FIG. 1 is purely an example and the cleaning chamber 116 may be any shape that is able to (1) receive the water flow 120 and the contained microplastics 122 coated with algae and/or bacteria (i.e., biofouled), (2) allow the microplastics 122 to be cleaned (microplastics 124 depict the microplastics as they are being cleaned), and (3) allow the water flow 120 to exit the cleaning chamber. Microplastics 122 may be coated entirely with algae and/or bacteria or may be only partially coated with algae and/or bacteria. In some embodiments, microplastics 122 are known to sink in the water column as algae and bacteria grow on them. Without an algae or bacterial coating, the majority of microplastics 122 may float.

As illustrated, transducer 102 generates microbubbles 104. In some embodiments, the transducer 102 is an ultrasonic cleaning device. In some embodiments, the transducer 102 may be any type of transducer that is capable of cleaning microplastics 122 of biological fouling (i.e., biofouling). Microbubbles 104 may clean the algae and/or bacteria from the surface of the microplastics 122 by generating an abrasive pressure gradient and shear forces over the surface of the microplastics 122. Microplastics 124 depict microplastics that are being cleaned by the microbubbles 104 as they pass through the cleaning chamber 116. The cleaned microplastics 126 are buoyant due to a lack of biofouling and, as a result, float upwards into the upper filter chamber 108. Microplastic collection device 106 collects the cleaned microplastics 126 and stores them for later removal. In some embodiments, microplastic collection device 106 is a vacuum head. In some embodiments, microplastic collection device 106 may be any apparatus that is able to collect the cleaned microplastics 126 from the water flow 120. Filter 114 allows water flow 120 and cleaned microplastics 126 to pass through from the cleaning chamber 116 to the upper filter chamber 108, but prevents anything larger than, for example, 5 mm in size from reaching the upper filter chamber. As mentioned above, microplastics are defined as particles less than 5 mm in diameter. This means that, for example, fish 128 above 5 mm in diameter do not reach the upper filter chamber. Further, microbubbles 104 are unlikely to harm most aquatic life and so any fish 128 that enter the cleaning chamber 116 may leave it unharmed.

In other embodiments of the invention not illustrated by FIG. 1, a filter that is otherwise analogous to filter 114 may allow objects of size greater than 5 mm through or a filter that does not allow objects of size less than 5 mm through. Embodiments of the filter 114 may include an adaptable mesh and an activated carbon filtration system. Once the microplastic collection device 106 is full of collected and stored cleaned microplastics 126, the apparatus 100 may return to the shore to be emptied. In some instances, the apparatus may be emptied by a vessel or drone without returning to shore.

Water flow 120 exits from the cleaning chamber 116 without filtration (as illustrated by water flow 118). The water flow 120 may exit without filtration because apparatus 100 is designed such that most microplastics 122 present in the inlet water flow 120 should have been cleaned and have risen into the upper filter chamber 108 before being able to float out cleaning chamber 116. Water flow 120 also exits the upper filter chamber 108 through filter 112 (illustrated by water flow 119), which prevents the exit of cleaned microplastics 126 from upper filter chamber 108 in the same direction. Small marine life 128 entering the cleaning chamber 116 may exit together with the water flow 120. The filter 114 may, optionally, be coated in a soft material so as not to harm larger aquatic animals.

Apparatus 100 may operate at different depths in the water column according to the depth that the maximum or a target size of microplastics 122 is predicted to be found as described below with reference to FIG. 4. Apparatus 100 may operate in fresh water or in salt water.

Figure 2:
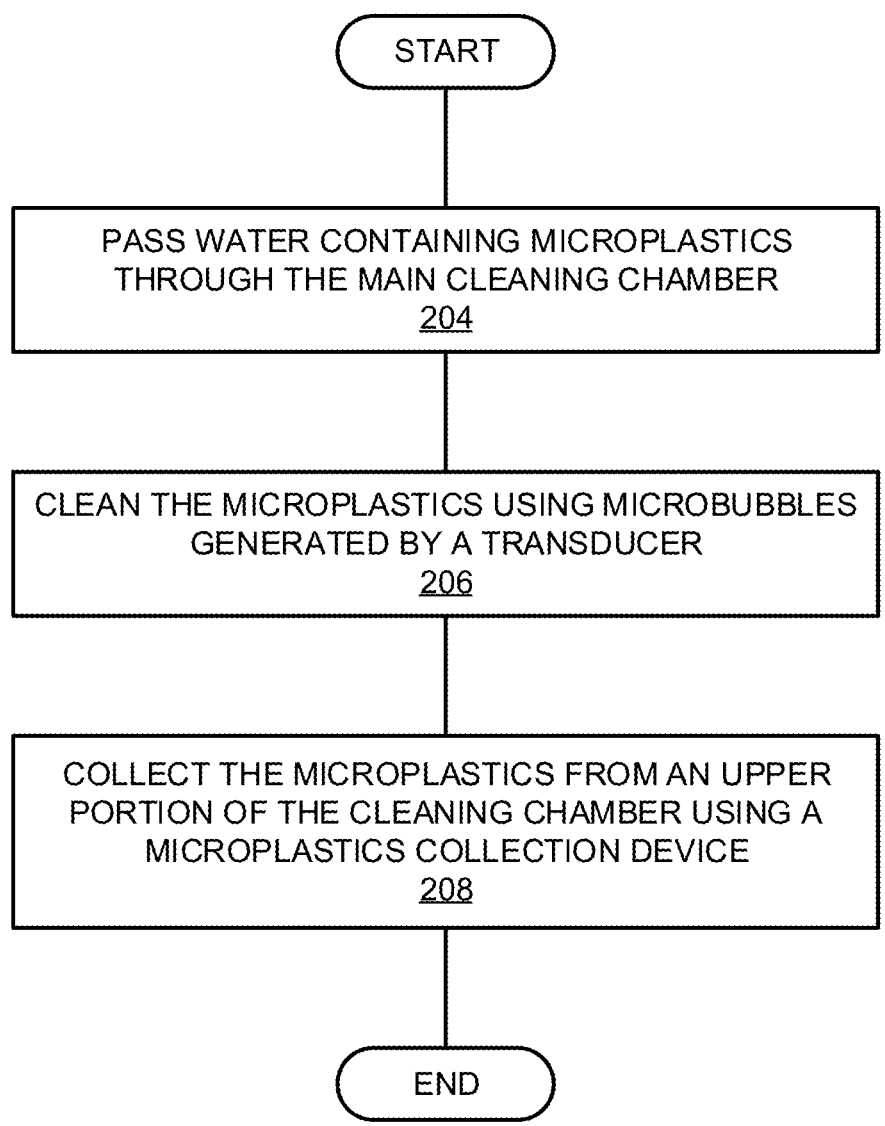
FIG. 2 depicts a flow diagram of a method for cleaning and collecting microplastics in an aquatic environment, according to some embodiments.

Referring to FIG. 2, a flow diagram of a method 200 for cleaning microplastics (e.g., microplastics 122 from FIG. 1) in an aquatic environment is depicted, according to some embodiments. Method 200 includes step 204, in which water (e.g., water flow 120 (FIG. 1)) containing the microplastics from the aquatic environment flows through a cleaning chamber (e.g., cleaning chamber 116 (FIG. 1)). In some embodiments, the water and contained microplastics coated with algae and/or bacteria flow through the cleaning chamber as the apparatus (e.g., apparatus 100 (FIG. 1)) is moved through the water. In some embodiments, the water is pumped through the cleaning chamber. The microplastics may be coated with biological fouling such as algae and/or bacteria. The microplastics may be coated entirely with algae and/or bacteria or may be only partially coated with algae and/or bacteria.

At step 206, the microplastics (e.g., microplastics 124 (FIG. 1)) flowing through the cleaning chamber are cleaned using microbubbles (e.g., microbubbles 104 (FIG. 1)) generated by a transducer (e.g., transducer 102 (FIG. 1)). In some embodiments, the transducer is an ultrasonic cleaning device. In some embodiments, the transducer may be of any type that is capable of cleaning microplastics of biological fouling. After having been cleaned, the microplastics (e.g., cleaned microplastics 126 (FIG. 1)) may be more buoyant and may float upwards into the upper filter chamber (e.g., upper filter chamber 108 (FIG. 1)). At step 208, the cleaned microplastics are collected from the upper filter chamber using a microplastic collection device (e.g., microplastic collection device 106 (FIG. 1)). In some embodiments, the microplastic collection device is a vacuum head. A filter (e.g., filter 114 (FIG. 1)) may allow water and cleaned microplastics to pass through from the cleaning chamber to the upper filter chamber (e.g., upper filter chamber 110 (FIG. 1)). Water may exit from the cleaning chamber without filtration as any microplastics present in the inlet water would likely exit through the upper filter chamber rather than exiting directly from the cleaning chamber. Water may also exit the upper filter chamber through a filter (e.g., filter 112 (FIG. 1)) which may be designed to prevent the exit of cleaned microplastics back into the water column. Small marine life (e.g., small marine life 128 (FIG. 1)) entering the cleaning chamber may exit together with the water.

Figure 3:
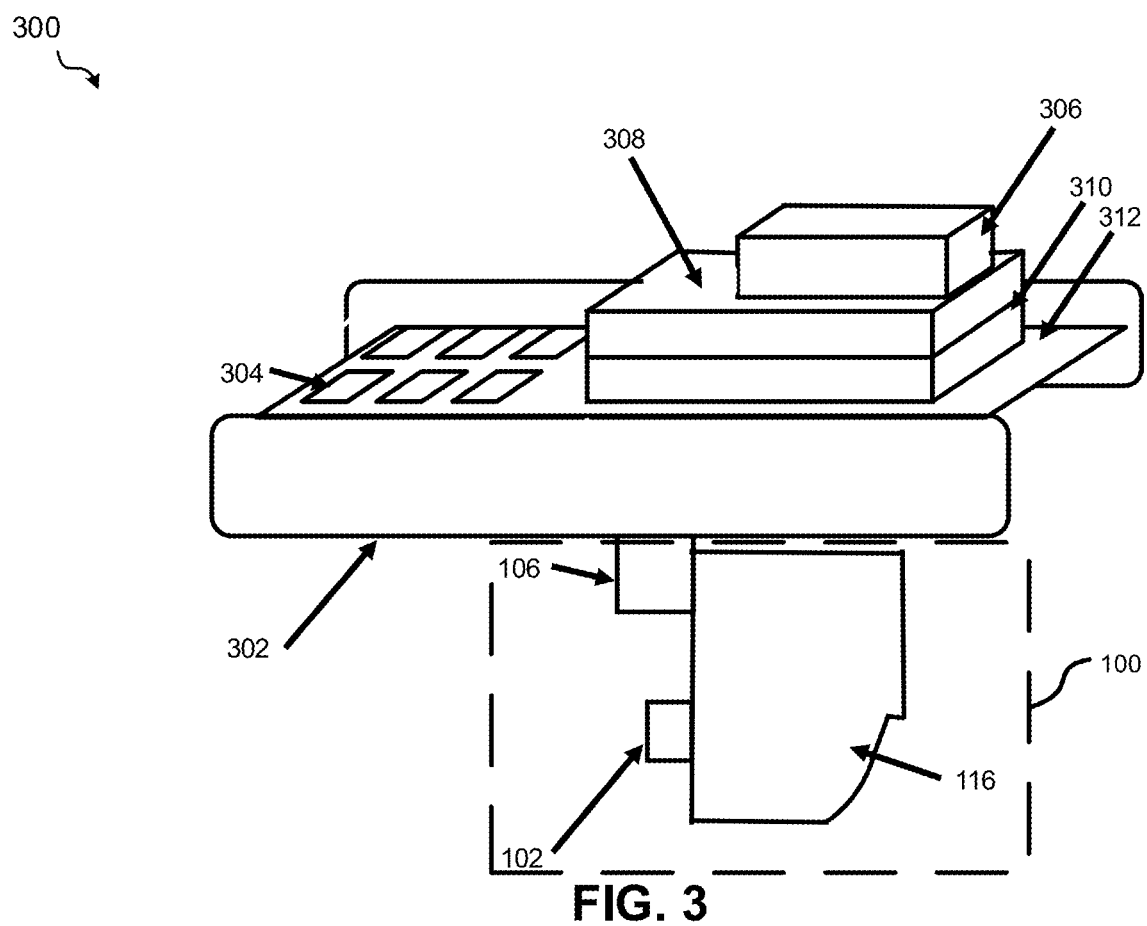
FIG. 3 depicts a schematic diagram of an apparatus for cleaning and collecting microplastics in an aquatic environment, according to some embodiments.

Referring to FIG. 3, a diagram of an apparatus 300 for cleaning microplastics (e.g., microplastics 122 (FIG. 1)) in an aquatic environment is depicted, according to some embodiments. Apparatus 300 includes a dock 302 on which the other portions of apparatus 300 are located. Dock 302 may be floating or may be submersible. Optionally, solar panels 304 may be used to power the apparatus 300. In some embodiments, tidal power may be used to power the apparatus 300. In some embodiments, the apparatus 300 and/or the dock 302 of the apparatus 300 is self-propelled. Affixed to dock 302 is the apparatus 100 of FIG. 1, with cleaning chamber 116, transducer 102, and microplastic collection device 106. In some embodiments, apparatus 100 may be affixed to dock 302 by an arm to allow the apparatus 100 to operate at different depths below the dock 302. In some embodiments, apparatus 100 may operate remotely and may return to dock 302 when it has collected cleaned microplastics (e.g., cleaned microplastics 126 (FIG. 1)) in order to discharge the cleaned microplastics. Environmental monitoring module 306 ascertains local environmental conditions. These local environmental conditions may include, for example, local tidal strength, local tidal currents, sunlight intensity, water temperature, water salinity, local wind speed, barographic pressure, amount of rainfall, geographic data (such as, for example, distance from a coast line and distance from a river estuary), etc. These local environmental conditions may further include the local microplastic concentration. This may be supplemented with global data from a central command system which commands a plurality of the microplastic cleaning apparatuses 300. Central control unit 308 may be able to make intelligent decisions (for example, dynamic decisions) regarding the geographical location where high concentrations of microplastics may be found, and also as to the depth to which the apparatus of FIG. 1 is to be placed below the dock 302. For example, the central control unit 308 may determine which locations to direct the apparatus(es) (e.g., apparatus 100 and/or 300) to and may be able to dynamically adjust the locations (e.g., redirect the apparatus(es)) when beneficial and/or necessary.

Associated with environmental monitoring device 306 and central control unit 308 are signal receivers and transmitters for receiving data from and sending data to the central command system. Optionally, in a system in which there are a plurality of apparatuses 300 for cleaning microplastics, the signal receivers and transmitters may be used to communicate between different apparatuses 300 so as to, for example, prevent too many devices congregating in one area. Waste container 310 receives cleaned microplastics from the apparatus 100 of FIG. 1. Apparatus 300 may optionally include an area for plastic discharge 312 and even a helipad allowing a rotary winged aircraft to land on the dock 302. Collected, cleaned microplastics may be removed by returning to the shore to empty the collected, cleaned microplastics; by returning to another vessel to empty the collected, cleaned microplastics; by an aerial vehicle (e.g., a drone) taking away the collected, cleaned microplastics, etc.

Figure 4:
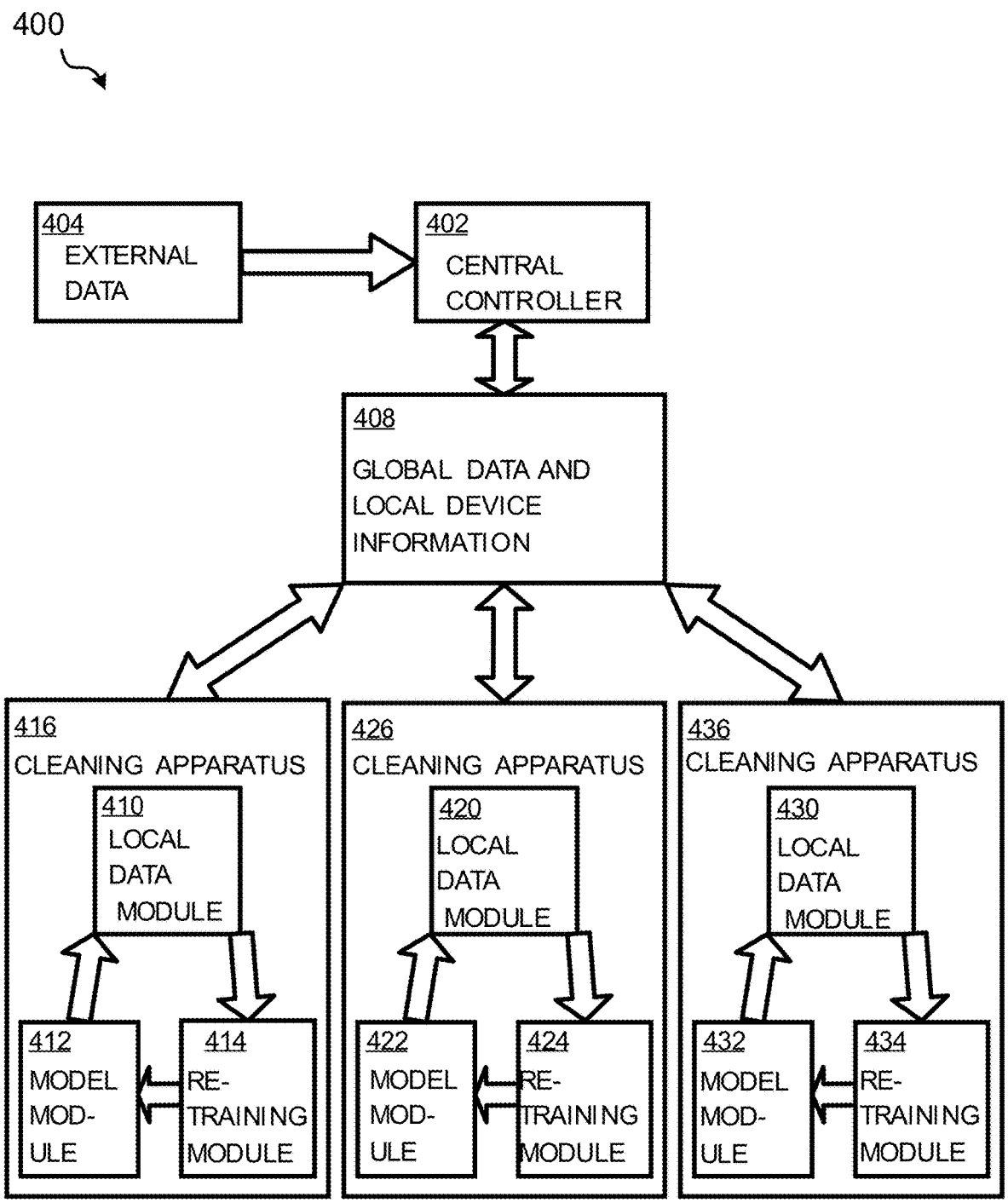
FIG. 4 depicts a block diagram of a microplastic cleaning system, according to some embodiments.

Referring to FIG. 4, a block diagram of a microplastic cleaning system 400 for use with the embodiments of FIG. 1-3 in order to allow an apparatus (e.g., apparatus 100 and/or 300 (FIG. 1 and FIG. 3, respectively)) to automatically determine (and in some instances adjust) the best geographic locations in which to operate is depicted, according to some embodiments. The microplastic cleaning system 400 may model workflow of an apparatus (e.g., apparatus 100 and/or 300 (FIG. 1 and FIG. 3, respectively)). Microplastic cleaning system 400 includes a central controller 402 that receives external data 404, such as, for example, shipping information and proximity to factories producing and/or discharging microplastics (e.g., microplastics 122 (FIG. 1)) and oceanographic predictions. In some embodiments, central controller 402 may also receive High Performance Computing (HPC) simulations, such as, for example, tidal and weather modelling. Global data and local device information 408 is sent from central controller 402 and deployed to a plurality of cleaning apparatuses 416, 426, and 436, such as those of FIG. 1 and FIG. 3. Global data and local device information 408 also includes local device information from apparatuses 416, 426, and/or 436, which may be used to generate an updated global model, which may then be communicated to all of the cleaning apparatuses 416, 426, and 436 with the purpose of enhancing their cleaning performance.

Cleaning apparatuses 416, 426, and 436 may each include a local data module (410, 420, and 430, respectively) which may collect local data such as the local environmental conditions referred to above with reference to FIG. 3. This collected data, together with deployment data, and global data and local device information 408, such as global microplastic concentration maps may be sent to retraining module 414, 424, and 434. The retraining module (414, 424, and 434) may use the various data retrain the local model so as to improve on the original predictions. The retrained local model may then be sent to the model module 412, which may apply the retrained model. The process of collecting (on local data module 410, 420, and 430), retraining (retraining module 414, 424, and 434), and applying (on model module 412, 422, and 432) may then be repeated.

Central controller 402 may utilize an Artificial Intelligence (AI) model. The AI model may be based upon universal Kriging. Kriging, or Gaussian process regression, is a method of interpolation in which the interpolated values are modeled by a Gaussian process governed by prior covariances. Under suitable assumptions for the prior covariances, Kriging may give good, linear, and unbiased predictions of the intermediate values. Kriging has previously been applied very successfully in geospatial problems such as mining. Kriging may provide a prediction and uncertainty estimate directly. Using Kriging prediction, a high concentration of microplastics may be found in a given location and depth, and can be balanced with the uncertainty in that prediction when a decision is made upon the best location and depth to filter. For example, it maybe sub-optimal to travel a large distance for a predicted high concentration with large uncertainty if there is a more certain but slightly lower predicted concentration close by. The model of microplastic concentration may improve as the actual concentrations found are fed back and the model is retrained locally on the cleaning apparatus. Kriging is a reasonably efficient maximum likelihood (ML) model.

The cleaning apparatuses (e.g., cleaning apparatus 100 (FIG. 1)) may also process a model to make effective automated changes to the filtration device of FIG. 1 to account for the depth in the water column that the maximum or a target size of microplastics is predicted to be found.

Figure 5:
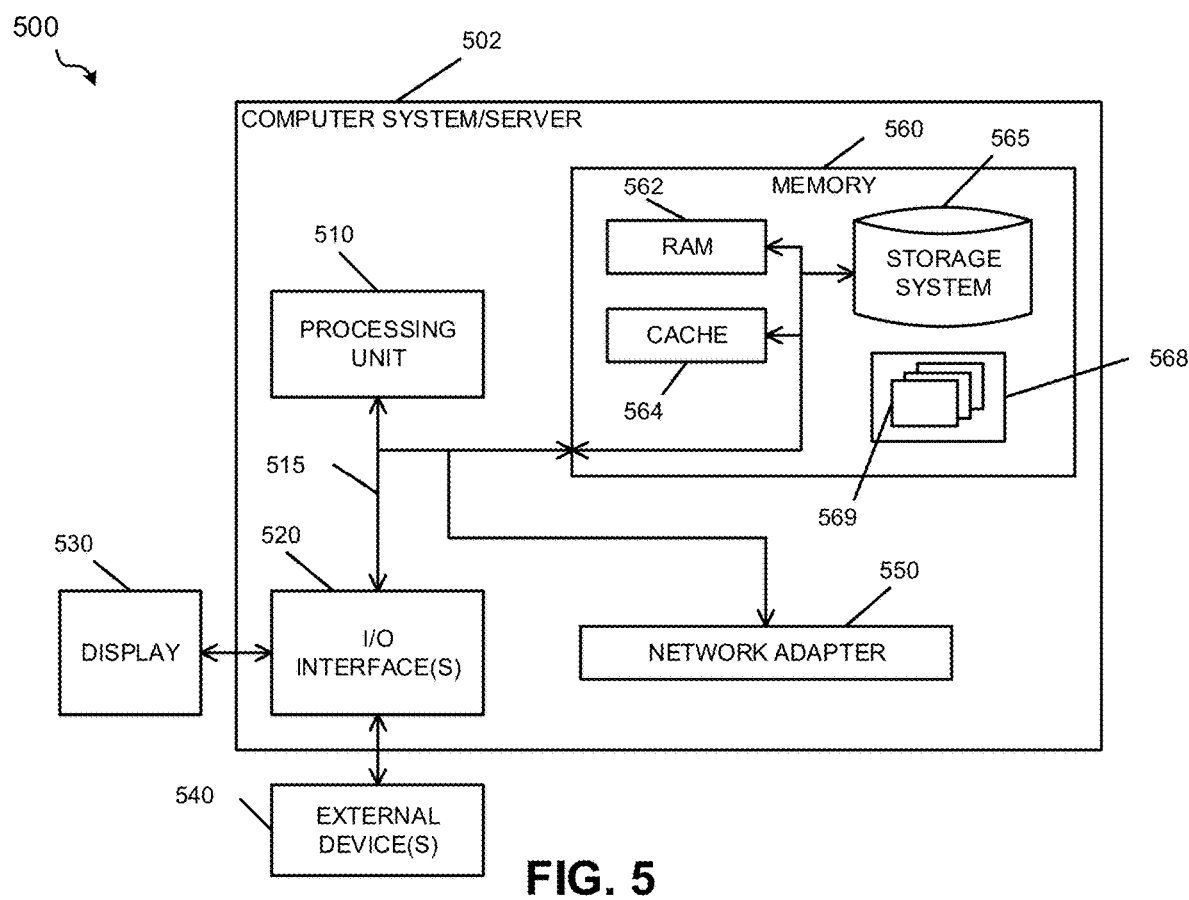
FIG. 5 depicts a block diagram of a sample computer system, according to some embodiments.

Referring to FIG. 5, computer system 500 is a computer system/server 502 is shown in the form of a general-purpose computing device, according to some embodiments. In some embodiments, computer system/server 502 is located on the linking device. In some embodiments, computer system 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for cleaning and collecting microplastics in an aquatic environment, the apparatus comprising:
    a cleaning chamber through which water containing the microplastics flows;
    a transducer configured to generate microbubbles of a size that causes the microbubbles to clean microplastics flowing through the cleaning chamber; and
    a filter chamber located above the cleaning chamber, wherein the filter chamber comprises a microplastic collection device operable to collect the microplastics.

2. The apparatus of claim 1, wherein the transducer is an ultrasonic transducer.

3. The apparatus of claim 1, wherein the cleaning chamber is configured to allow unfiltered egress of water and marine organisms, wherein the filter chamber is configured to collect cleaned buoyant microplastics, and wherein the filter chamber comprises a filter to allow egress of water whilst containing the cleaned buoyant microplastics.

4. The apparatus of claim 1, wherein the apparatus is affixed to a dock configured to float on a surface of the aquatic environment.

5. The apparatus of claim 1, wherein the apparatus is located in a self-propelled submersible dock, and wherein the apparatus is configured to allow water to flow from the aquatic environment through the cleaning chamber as the self-propelled submersible dock moves through the aquatic environment.

6. A method of cleaning and collecting microplastics in an aquatic environment, comprising:
   passing water containing the microplastics from the aquatic environment through a cleaning chamber;
   generating, using a transducer, microbubbles in the cleaning chamber; and
   collecting microplastics that have been cleaned by the microbubbles from an upper portion of the cleaning chamber using a microplastic collection device.

7. The method of claim 6, wherein the transducer is an ultrasonic transducer.

8. The method of claim 6, wherein the cleaning chamber is configured to allow unfiltered egress of water and marine organisms, wherein a filter chamber is configured to collect cleaned buoyant microplastics, and wherein the filter chamber comprises a filter to allow egress of water whilst containing the cleaned buoyant microplastics.

9. The method of claim 6, wherein the cleaning chamber, the transducer, and the microplastic collection device are part of an apparatus, and wherein the apparatus is affixed to a dock configured to float on a surface of the aquatic environment.

10. The method of claim 6, wherein the cleaning chamber, the transducer, and the microplastic collection device are part of an apparatus, and wherein the apparatus is located in a self-propelled submersible dock, the apparatus configured to allow water to flow from the aquatic environment through the cleaning chamber as the self-propelled submersible dock moves through the aquatic environment.

11. The method of claim 6, further comprising:
   receiving external data and simulation results at a central controller;
   receiving data on local environment conditions and actual microplastic concentration from a plurality of remote devices;
   collecting local environment conditions and actual microplastic concentrations on at least one of the remote devices;
   retraining a local model of likely locations and concentrations of microplastics using the local environment conditions and the actual microplastic concentrations; and
   applying the retrained model.

12. The method of claim 11, wherein the central controller determines where to operate based on the local model.

13. The method of claim 11, wherein the local model is based upon universal Kriging.

14. A computer program product comprising a computer readable storage medium having program instructions embodied therewith, the program instructions executable by a server to cause the server to perform a method, the method comprising:
   receiving external data and simulation results at a central controller;
   receiving data on local environment conditions and actual microplastic concentration from a plurality of remote devices;
   generating microbubbles in a cleaning chamber;
   collecting local environment conditions and actual microplastic concentrations on at least one of the remote devices;
   retraining a local model of likely locations and concentrations of microplastics using the local environment conditions and the actual microplastic concentrations; and
   applying the retrained model.

15. The computer program product of claim 14, wherein the central controller determines where to operate based on the local model.

16. The computer program product of claim 14, wherein the local model is based upon universal Kriging.

17. The computer program product of claim 14, wherein the cleaning chamber is configured to allow unfiltered egress of water and marine organisms, wherein a filter chamber is configured to collect cleaned buoyant microplastics, and wherein the filter chamber comprises a filter to allow egress of water whilst containing the cleaned buoyant microplastics.

18. The computer program product of claim 14, wherein the remote devices comprise a transducer and a microplastic collection device.

19. The computer program product of claim 18, wherein the cleaning chamber, the transducer, and the microplastic collection device are part of an apparatus, and wherein the apparatus is affixed to a dock configured to float on a surface of an aquatic environment.

20. The computer program product of claim 18, wherein the cleaning chamber, the transducer, and the microplastic collection device are part of an apparatus, and wherein the apparatus is located in a self-propelled submersible dock, the apparatus configured to allow water to flow from an aquatic environment through the cleaning chamber as the self-propelled submersible dock moves through the aquatic environment.

* * * * *